United States Patent [19]

Yoshida

[11] Patent Number: 4,491,324
[45] Date of Patent: Jan. 1, 1985

[54] ELECTRONIC FIGHTING SPORT GAME APPARATUS

[75] Inventor: Takao Yoshida, Tokyo, Japan

[73] Assignee: Casio Computer Co., Ltd., Tokyo, Japan

[21] Appl. No.: 422,962

[22] Filed: Sep. 24, 1982

[30] Foreign Application Priority Data

Oct. 7, 1981 [JP] Japan .................................. 56/159780

[51] Int. Cl.$^3$ ................................................ A63F 9/00
[52] U.S. Cl. ................................ 273/85 G; 273/1 GC
[58] Field of Search ................. 273/1 E, 1 GC, 85 G, 273/94, 313, 88, DIG. 28; 272/76

[56] References Cited

U.S. PATENT DOCUMENTS 4,366,960 1/1983 Bromley et al. .................. 273/1 GC
4,381,864 5/1983 Bromley et al. ....................... 273/88
4,398,086 8/1983 Smith .................................... 364/410

FOREIGN PATENT DOCUMENTS 2041594 9/1980 United Kingdom ................ 273/313

Primary Examiner—Richard C. Pinkham
Assistant Examiner—MaryAnn Stoll
Attorney, Agent, or Firm—Frishauf, Holtz, Goodman and Woodward

[57] ABSTRACT

An electronic fighting sport game apparatus includes stamina data memory sections which store initial and current stamina data of fighters or boxers. A stamina data arithmetic section reads out the current stamina data of the attacked boxer from the stamina data memory section when one of the boxers delivers a clean punch. The readout stamina data is decreased by a predetermined amount. The decreased stamina data is stored again in the stamina data memory section. The action or movement of the boxers is performed in accordance with stamina data. The winner or loser is judged by determining whether the final stamina data of a boxer is larger or smaller than that of his opponent.

23 Claims, 32 Drawing Figures

F I G. 1
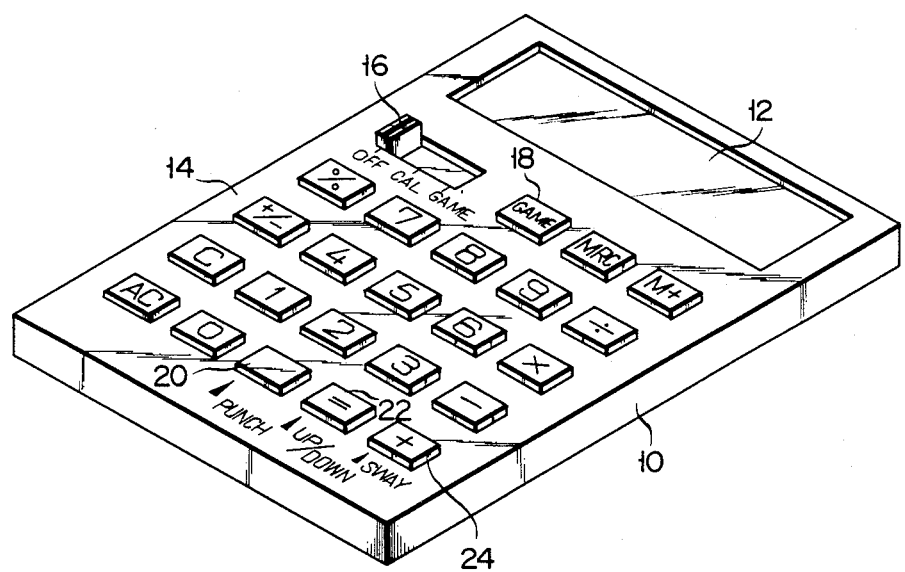

F I G. 4

| WINNING NUMBER | OPPONENT | | | YOUR BOXER | | | OPPONENT |
|---|---|---|---|---|---|---|---|
| | STAMINA | POWER OF PUNCH | | STAMINA | POWER OF PUNCH | | ATTACK PATTERN |
| 1 | 50 | 6 | | 50 | 6 | | PUNCH DATA, GUARD DATA, SWAY DATA |
| 2 | 55 | 6 | | 55 | 6 | | PUNCH DATA, GUARD DATA, SWAY DATA |
| 3 | 60 | 7 | | 60 | 7 | | PUNCH DATA, GUARD DATA, SWAY DATA |
| --- | --- | --- | | --- | --- | | --- |
| 20 | 95 | 9 | | 75 | 8 | | PUNCH DATA, GUARD DATA, SWAY DATA |

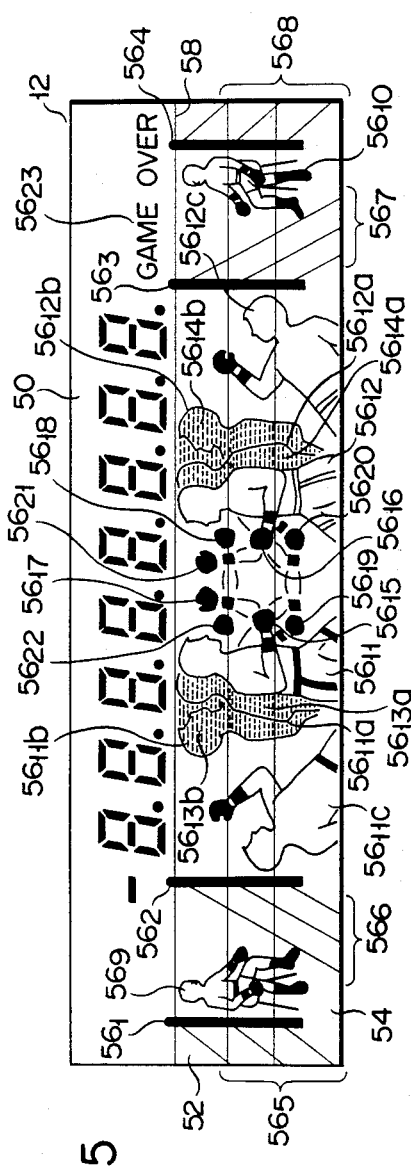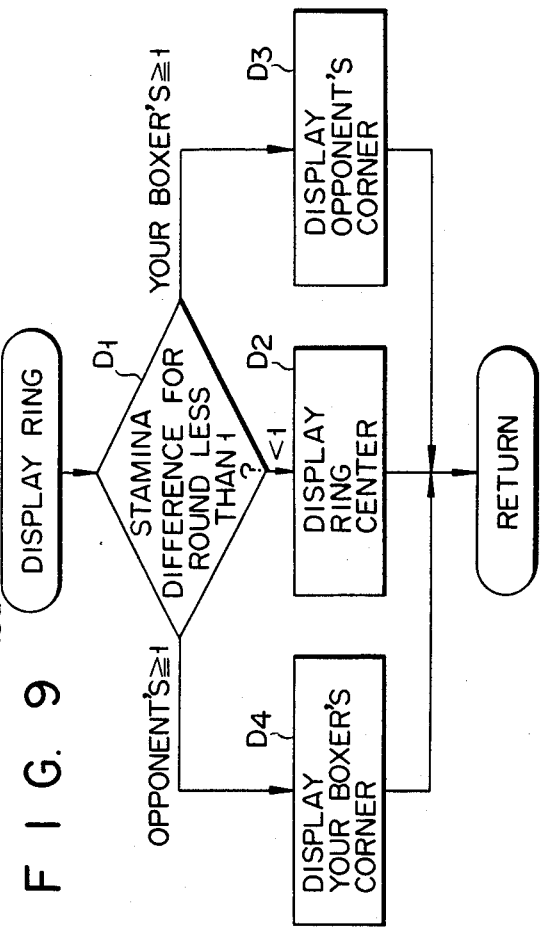

F I G. 11A 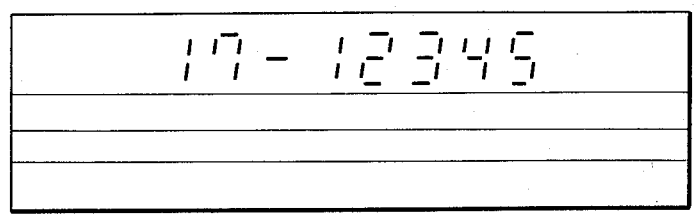
F I G. 11B 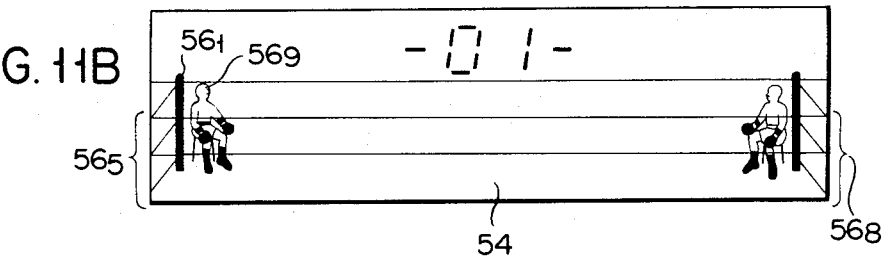
F I G. 11C 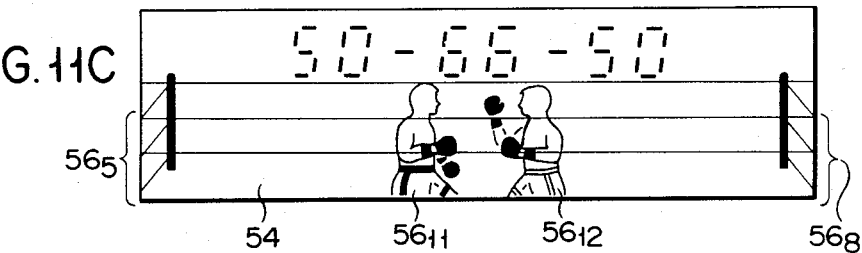
F I G. 11D 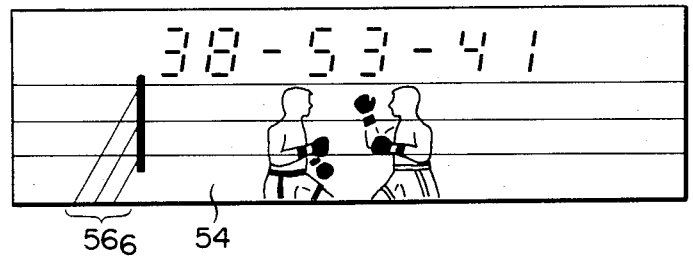

F I G. 11E 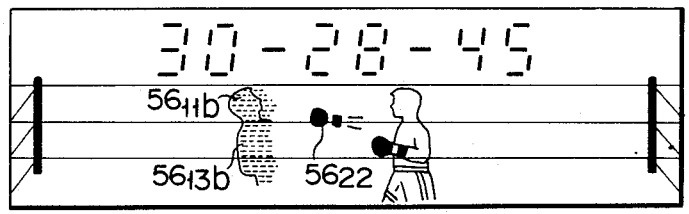
F I G. 11F 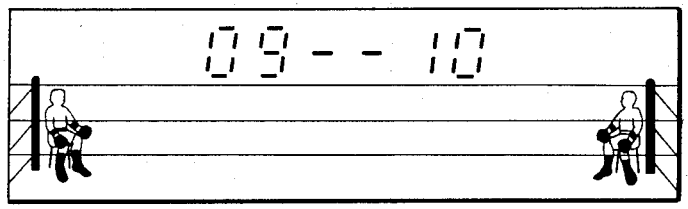
F I G. 11G 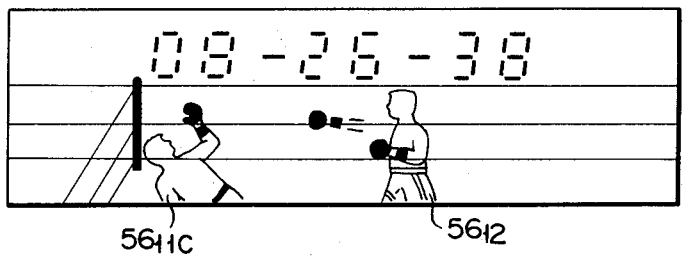
F I G. 11H 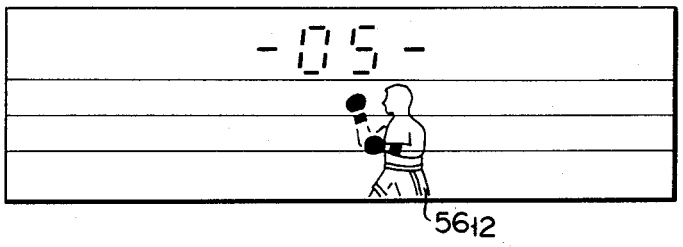

F I G. 11I 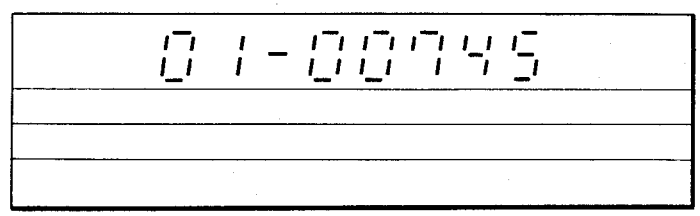
F I G. 11J 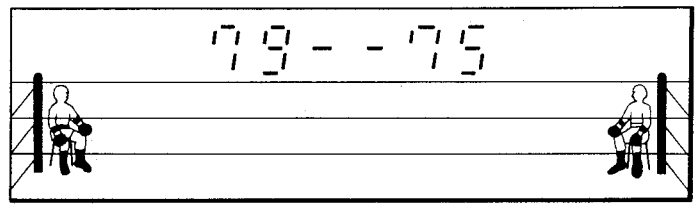
F I G. 11K 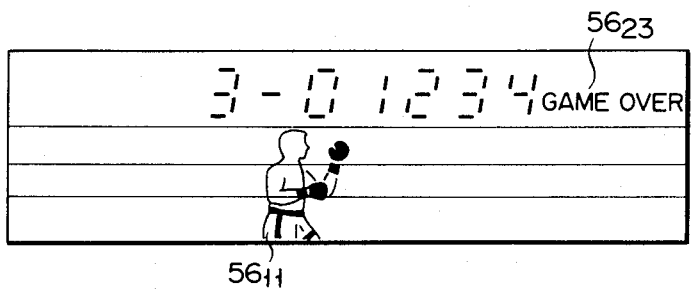

ELECTRONIC FIGHTING SPORT GAME APPARATUS

BACKGROUND OF THE INVENTION

The present invention relates to a game machine and, more particularly, to a game machine which has a fighting sports function such as boxing and fencing, and provides an improved operation display.

Various types of electronic game equipment using LSIs have been recently marketed. One of them simulates a general fighting sport such as boxing.

The boxing game is played with the conventional game device in accordance with the following regulations. When a player presses an attack key at a predetermined time, the opponent boxer is always knocked down. When the opponent boxer receives three knock downs, he loses the bout by a knockout. The power of a punch and the method of a knock down are constant throughout the rounds.

However, when spectators observe an actual boxing match, the power of a punch and the kind of knock down are changed in accordance with the stamina of the boxers. Further, the boxers' stamina greatly determines the winning or losing of the bout.

In the conventional game device, since the strength of a punch and the stamina are constant throughout the rounds, the bout becomes monotonous as compared with an actual boxing match. A game device which has abundant variations as in an actual boxing thus is desirable.

SUMMARY OF THE INVENTION

It is, therefore, an object of the present invention to provide a game machine which has a fighting sport function, and which provides an improved display arranged in accordance with an actual match.

This object is achieved by the present fighting sport game machine, which includes displaying means having an attack display portion in which opposing fighting display figures attack each other; driving means connected to said displaying means for selectively supplying a drive signal to the fighting display figures; display data storing means connected to said driving means for storing display data to selectively display the fighting display figures and for properly supplying the display data to said driving means; key input means, including attack keys specifying an attack for at least one of the fighting display figures displayed on said displaying means; display data producing means connected to said key input means and said display data storing means for producing the display data for said at least one of the fighting display figures in accordance with said attack keys and for supplying the display data to said display data storing means; attack success determining means connected to said display data storing means for receiving the display data of the fighting display figures which is stored in said display data storing means for determining which fighting display figure succeeds in delivering a blow; stamina data storing means for storing stamina data preset for the fighting display figures and current stamina data thereof; stamina data operating means connected to said stamina data storing means and said attack success determining means for reading out from said storing means the current stamina data of the fighting display figure attacked by an opponent thereof when said determining means determines the attack is successful, for decrementing a count of stamina by a predetermined amount and for restoring into said storing means stamina data corresponding to a decreased count; and winner determining means connected to said stamina data storing means for receiving the stamina data of the fighting display figures which is stored in said stamina data storing means to determine a winner in accordance with predetermined conditions.

According to the present invention, the count of stamina data of the fighting display figures (boxers) is decreased with the number of rounds. The winner or loser is determined by a difference between the counts of stamina data of the boxers.

In this manner, the movement of the boxer is performed according to the stamina data based on the number of rounds, that is, by a simulation of an actual boxing match. Therefore, the electronic equipment according to the present invention can provide a more realistic fight.

BRIEF DESCRIPTION OF THE DRAWINGS

By way of example and to make the description clearer, reference is made to the accompanying drawings in which:

FIG. 1 is a perspective view of a compact electronic calculator according to an embodiment of the present invention;

FIG. 4 is a view showing pattern data stored in a pattern data memory section 40 in FIG. 2;

FIG. 5 is a view showing the arrangement of a display section 12 shown in FIG. 2;

FIGS. 6A to 9 are flowcharts for explaining the mode of operation of the embodiment; and FIGS. 10A to 11K are views for explaining the mode of operation of the display figures displayed on the display section 12 of the embodiment.

DETAILED DESCRIPTION OF THE PREFERRED EMBODIMENT

Figure 2:
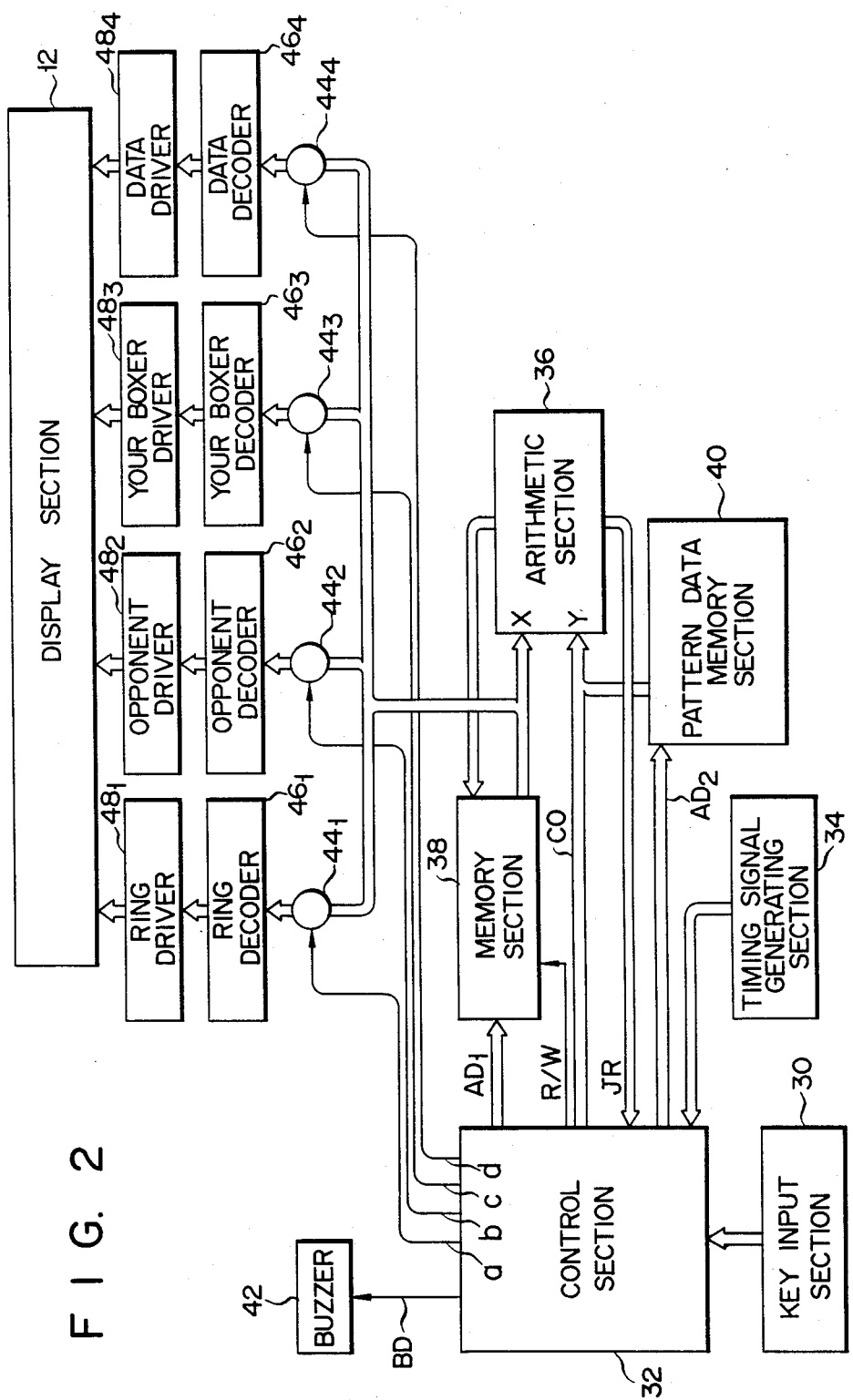
FIG. 2 is a block diagram of the compact electronic calculator shown in FIG. 1.
Figure 3:
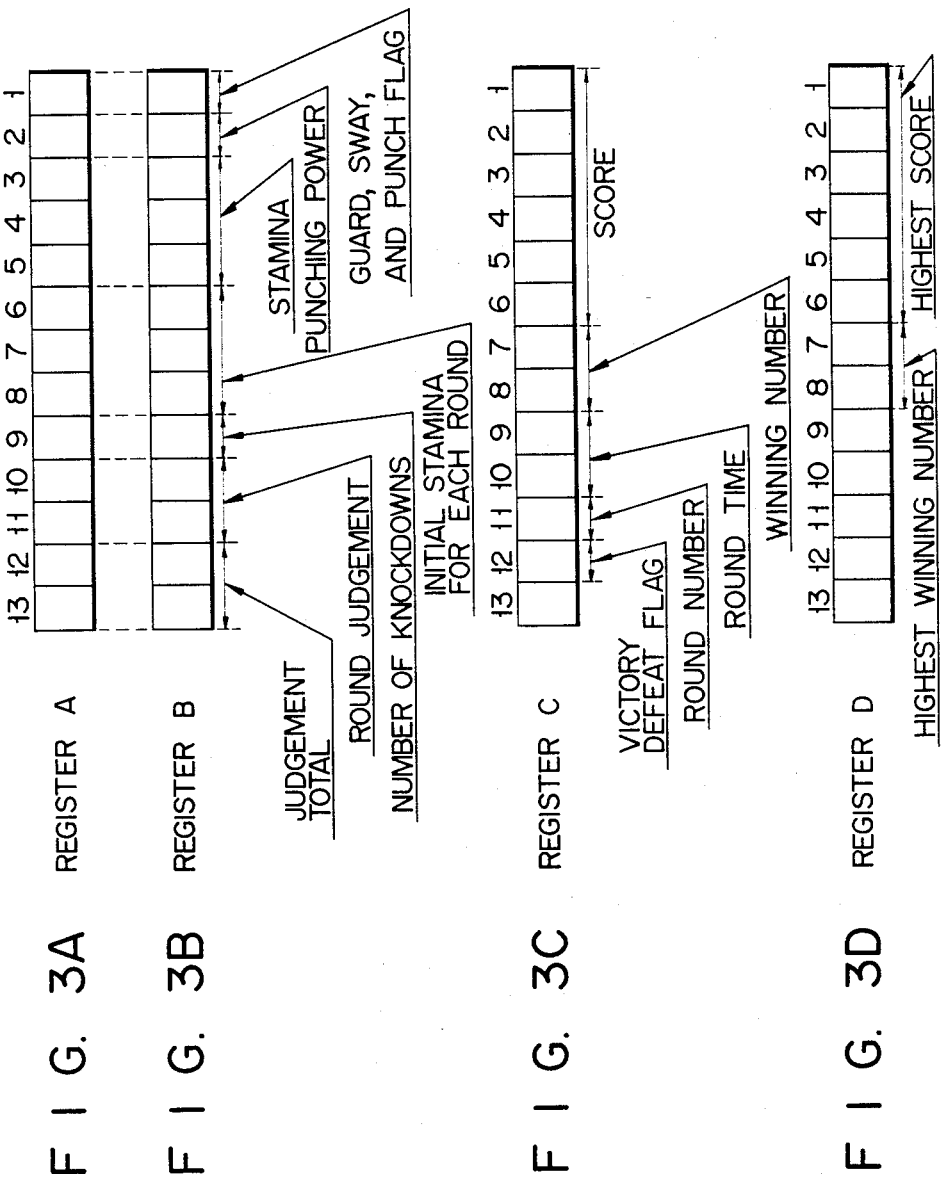
FIGS. 3A to 3D are views showing the configuration of registers A, B, C and D which constitute a memory section 38 shown in FIG. 2.

A compact electronic calculator according to an embodiment of the present invention will be described with reference to the accompanying drawings.

According to this embodiment, the compact electronic calculator performs a boxing game as well as arithmetical operations. FIG. 1 shows the overall appearance of the compact electronic calculator. A display section 12 and a keyboard 14 are arranged on the upper surface of a main body 10. The display section 12 may comprise liquid crystal display elements, and a detailed description thereof will be given later. The keyboard 14 has ten keys, various function command keys, a mode selection switch 16 which is set to one of the OFF, CAL (calculation) and GAME positions, and a game key 18 to start the game. Decimal, "equal" and "plus" keys 20, 22 and 24 respectively perform these basic functions in the calculation mode. However, when the mode selection switch 16 is set to the game position, the decimal key 20 functions as a punch key, the "equal" key 22 functions as an up/down key which moves the hand up and down to indicate the guard position, and the "plus" key 24 functions as a sway key which allows the boxer to sway to dodge the opponent's blow.

The circuit arrangement in the main body 10 will be described with reference to FIG. 2. A key input section 30 produces data corresponding to key-in operations at the keyboard 14 shown in FIG. 1 and supplies it to a control section 32. Various timing signals are supplied from a timing signal generating section 34 to the control section 32. The control section 32 comprises a read-only memory (ROM) which stores various microprograms for arithmetic operation and game control operation. The control section 32 produces various control signals in accordance with a decision signal JR obtained by input data from the key input section 30, or a calculated result from an arithmetic section 36. The control section 32 supplies address data AD1 and R/W instruction signals to a memory section 38, a numerical code CO to an input terminal Y of the arithmetic section 36, address data AD2 to a pattern data memory section 40, a drive signal BD to a buzzer 42, and gate control signals a to d, respectively, to gate circuits $44_1$ to $44_4$. The memory section 38 comprises a random access memory (RAM) and has registers for arithmetic operation and game operation. Game registers are comprised of four types of registers A, B, C and D. Data of your boxer is stored in the register A, while data of the opponent boxer is stored in the register B. In each register A or B, guard, sway and punch flag data is stored in the first digit position; punching power flag data is stored in the second digit position; stamina data is stored in the third to fifth digit positions; initial stamina data for each round is stored in the sixth to eighth digit positions; data of the number of knockdowns is stored in the ninth digit position; round judgement data is stored in the tenth and eleventh digit positions; and judgement total data is stored in the twelfth and thirteenth digit positions. In the register C, score data is stored in the first to sixth digit positions; winning number data is stored in the seventh and eighth digit positions; round time data is stored in the ninth and tenth digit positions; round number data is stored in the eleventh digit position; and flag data of the victory or defeat is stored in the twelfth digit position. In the register D, highest score data is stored in the first to sixth digit positions; and highest winning number data is stored in the seventh and eighth digit positions.

Data read out from the memory section 38 having the above registers is supplied to an input terminal X of the arithmetic section 36. Readout data from the pattern data memory section 40 as well as the numerical code CO from the control section 32 are supplied to the input terminal Y of the arithmetic section 36. Game pattern data shown in FIG. 4 is stored in the pattern data memory section 40. The game pattern data comprises stamina and the power of a punch of your boxer and the opponent boxer, and an attack pattern of the opponent. The winning number is in the range of 1 to 20, and the stamina and the power of a punch of both boxers are identically and sequentially increased until the winning number is 10. Thereafter, these are increased by different amounts for your boxer and the opponent. At the same time, the attack pattern contents such as punching, guard and swaying are also changed. In this case, as the winning number is increased, the opponent's attack pattern becomes faster and more complicated.

The arithmetic section 36 which receives readout data from the pattern data memory section 40 performs arithmetic operation in accordance with the control signal from the control section 32. The calculated result is supplied to the memory section 38 which then stores it. The arithmetic section 36 has a circuit for determining the presence or absence of data of the calculated result and a carry signal. A decision signal JR is supplied to the control section 32. The readout contents from the memory section 38 are supplied to a ring decoder $46_1$, an opponent decoder $46_2$, a your boxer decoder $46_3$ and a data decoder $46_4$, respectively, in response to the gate control signals a to d which are supplied from the control section 32 to corresponding gate circuits $44_1$ to $44_4$. Decoded outputs from the decoders $46_1$ to $46_4$ are supplied to the display section 12 through a ring driver $48_1$, an opponent driver $48_2$, a your-boxer driver $48_3$ and a data driver $48_4$, respectively. The decoded outputs then drive predetermined display segments.

As shown in FIG. 5, the display section 12 comprises an 8-digit digital display portion 50 for displaying numerical data, and an animated display portion 52. The animated display portion 52 displays corner segments $56_1$ and $56_4$ of a boxing ring 54. Three ropes are looped through the corner segments $56_1$ to $56_4$. A rear rope 58 is printed on the screen and is fixed. Side ropes are formed by segments $56_5$ to $56_8$. Segments $56_9$ and $56_{10}$ show boxers waiting before a bout, or between rounds at the corner segments. At the center of the ring, segments $56_{12}$ and $56_{11}$ which, respectively, show your boxer and his opponent, are formed. Behind the opponent as shown in his basic fighting posture, segments $56_{11a}$ and $56_{11b}$ are formed which, respectively, show a damaged posture from receiving an effective blow from your boxer, and a swaying posture. Similarly, behind your boxer as shown in his basic fighting posture, segments $56_{12a}$ and $56_{12b}$ are formed which, respectively, show a damaged posture from receiving an effective blow from the opponent, and a swaying posture. Further, segments $56_{11c}$ and $56_{12c}$ are formed to show, respectively, KO postures of the opponent and your boxer. The segments $56_{11a}$, $56_{11b}$, $56_{12a}$ and $56_{12b}$ show the outlines of the boxers which are shaded by corresponding dotted line segments $56_{13a}$, $56_{13b}$, $56_{14a}$ and $56_{14b}$. Further, segments showing the arm and the punching position are formed integrally with the boxer. However, the front arm and its glove are fixed and displayed by segments $56_{15}$ and $56_{16}$. In the opponent located to the left-hand side, the left glove in blocking is indicated by segments $56_{17}$ and $56_{19}$, and the left glove for a clean head punch and a clean body blow are indicated by segments $56_{18}$ and $56_{20}$, respectively. The segments $56_{17}$ and $56_{18}$ show the state where the left arm is moved up, i.e., the segment $56_{17}$ shows blocking; and the segment $56_{18}$ shows clean head punching. In your boxer, segments $56_{21}$ and $56_{20}$ show the right glove which blocks the opponent's blow, and segments $56_{22}$ and $56_{19}$ show a head punch and a body blow, respectively. The segments $56_{21}$ and $56_{22}$ show that the arm is located in the upper position, i.e., the segment $56_{21}$ shows blocking; and the segment $56_{22}$ shows a clean head punch. The segments $56_{20}$ and $56_{19}$ show that the arm is located in the lower position i.e., the segment $56_{20}$ shows blocking; and the segment $56_{19}$ shows a body blow. In this case, the segments $56_{20}$ and $56_{19}$ are used to display the guard of your boxer as well as a punch of the opponent, which is distinguished by a segment indicating a wrist. A segment $56_{23}$ is included to show a sign "GAME OVER" to the right of the digital display portion 50.

Conditions for the boxing game according to the embodiment of the present invention are as follows:

(A) You can play 20 bouts at maximum. In each bout there are 8 rounds, each lasting about 30 seconds. You must last each round and win your bouts on points or by KO.

(B) Data of the stamina and data of the power of a punch which are stored in the pattern data memory section 40 as shown in FIG. 4 are supplied to your boxer and his opponent in accordance with the winning number. The stamina and the power of a punch are changed according to the number of rounds. In particular, the power of a punch is determined by the stamina as follows:

TABLE 1

| Stamina | Power of a Punch |
| --- | --- |
| 0 to 9 | 1 |
| 10 to 19 | 2 |
| 20 to 29 | 3 |
| 30 to 39 | 4 |
| 40 to 49 | 5 |
| 50 to 59 | 6 |
| 60 to 69 | 7 |
| 70 to 79 | 8 |
| 80 to 95 | 9 |

Table 1 shows the upper limit of the power of a punch in accordance with the stamina. Every time a flow, to be described later, is repeated in processing to obtain the power of a punch, the count thereof will be incremented by one to the upper limit. If your boxer misses a punch, the power of a punch temporarily becomes "1". On the other hand, when the opponent sways to dodge a blow, the power of a punch becomes "9". If your blow is blocked by the opponent, your punch power is decreased by two.

(C) The judgment for each round can be calculated by the following relation:

| Your Boxer: | 10 - (knockdown number × 2) = A | |
| --- | --- | --- |
| Opponent: | 10 - (knockdown number × 2) = B | (1) |
| Your Boxer: | (Initial stamina for each round) - (current stamina) = A' | |
| Opponent: | (Initial stamina for each round) - (current stamina) = B' | (2) |

Values A, B, A' and B' are obtained by relationships (1) and (2). If value A' is greater than B', the count of A is decremented by one, and vice versa. In this case, if values A and B are both less than 10, the values are increased by one until one of the values reaches 10. The judgment is made according to values A and B.

(D) The scores are not indicated by the winning number but by the total scores. Scores are determined as follows:

(1) Clean blow: Points equal to {(the power of a punch)×0.6} are added.

| (2) Knock out (KO): | 1,000 points are added for a KO in the first round; 900 points are added for a KO in the second round; 800 points are added for a KO in the third round; 700 points are added for a KO in the fourth round; 300 points are added for a KO in the eighth round. |
| --- | --- |

(3) Knockdown: 10 points are added for each knockdown.

(E) Conditions for a clean blow or punch, a knockdown and a knock out are determined as follows:

(1) Your boxer throws a clean punch to the opponent who neither sways to dodge the clean punch nor blocks it. If the power of the punch is more than 4, your boxer delivers a strong punch; otherwise, he throws a weak punch. The above can also be applied to the opponent.

(2) Your boxer knocks down the opponent if the stamina of your boxer is 10 greater than that of the opponent. When the opponent's stamina is so small that the count of his stamina is 9 smaller than that of your boxer, the opponent may be knocked out even if your boxer throws a weak blow. The above can also be applied to the opponent.

(3) Your boxer knocks out the opponent if the stamina of the opponent is less than 10. The count of stamina is decreased by one for each count operation. When the count reaches zero, your boxer knocks out the opponent. The above can also be applied to the opponent.

When the stamina is more than 10, the count is decreased by an amount corresponding to the damage. If 8 countdowns occur, the count is decreased by 8.

If the stamina of the opponent is less than 1 when your boxer delivers a clean punch to the opponent, your boxer immediately knocks out the opponent. The above can also be applied to the opponent.

(F) When your boxer throws a punch which causes the opponent to be one down in stamina difference at the beginning of a round, your boxer can trap the opponent in the rope corner. If the opponent does the same, your boxer is trapped in the rope corner. If neither occurs, your boxer and the opponent fight against each other at the center of the ring.

(G) The stamina and the power of a punch are displayed at the digital display portion 50. In this case, the stamina and the power of a punch of the opponent are displayed in the upper four digits, whereas the stamina and the power of a punch of your boxer and displayed in the lower four digits.

(H) Sounds are generated by the buzzer 42 in response to a signal BD from the control section 32 at the times of game start, round display, clean blow hitting, blocking and swaying, KO judgement display, and "game over".

Figure 6A:
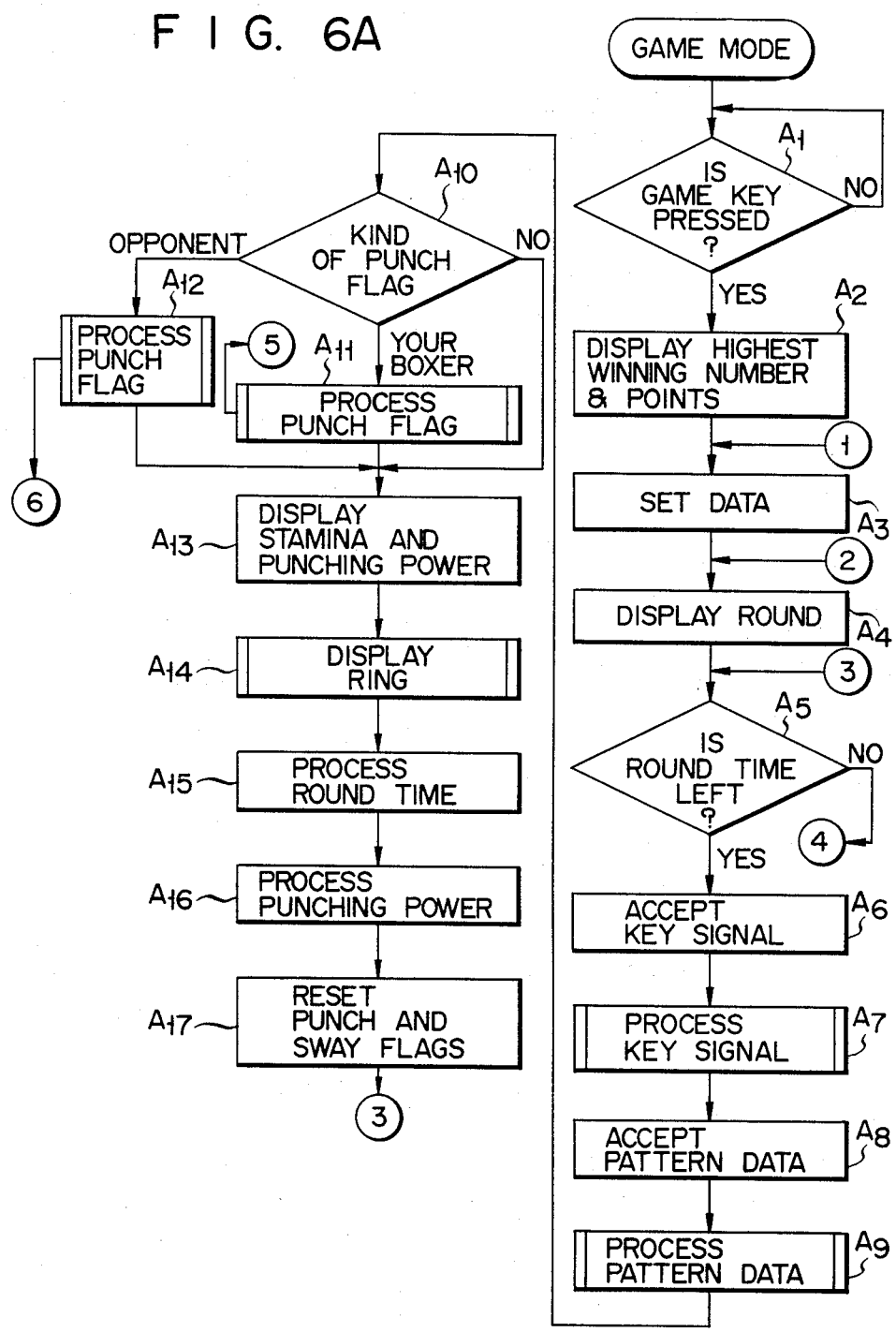
Figure 6B:
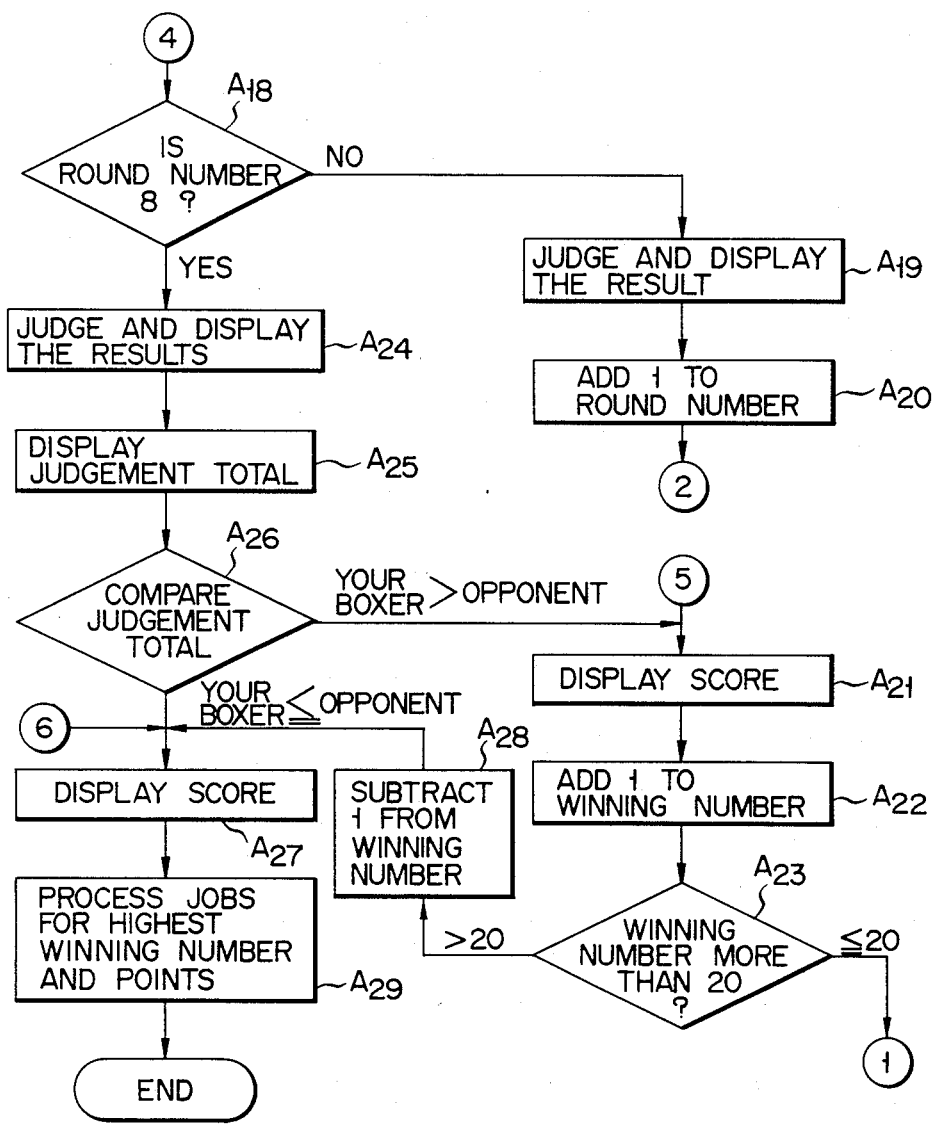

The mode of operation of this embodiment will be described with reference to the flowcharts in FIGS. 6A and 6B. To play the game, the mode selection switch 16 is set to the game mode and the game key 18 is pressed. When the mode selection switch 16 is set to the game mode, the flows shown in FIGS. 6A and 6B are performed by the control section 32 shown in FIG. 2. In step A1, it is checked whether or not the game key 18 is pressed. If NO, the waiting mode is initiated in step A1 until the game key 18 is pressed. When depression of the game key 18 is detected in step A1, the flow advances to step A2. Data of the highest winning number and points is read out from the register D and supplied to the data decoder $46_4$ through the gate circuit $44_4$. The decoded output is supplied to the data driver $48_4$ and is displayed at the digital display portion 50. FIG. 11A shows a case in which the highest winning number is 17 and the highest number of points or score is 12345. In step A3, pattern data is read out from the pattern data memory section 40 and is set in the registers A and B of the memory section 38. In this case, data corresponding to a winning number of 1 is read out from the pattern data memory section 40. For your boxer, data of stamina corresponding to 50 and data of the power of a punch corresponding to 6 are written in the register A. For the opponent, data of stamina corresponding to 50 and data of the power of a punch corresponding to 6 are written in the register B. For your boxer and its opponent, data of initial stamina for each round is stored in the sixth to eighth digit positions of the registers A and B. Data of the round time corresponding to 30 seconds is written in the ninth and tenth digit positions of the register C. Data of the round number of 1 is written in the eleventh digit position of the register C. In step A4, the data of the round number of 1 is supplied to the data decoder $46_4$ through the gate circuit $44_4$ and is displayed at the digital display portion 50 as shown in FIG. 11B. At this time, the corner display segments $56_1$ and $56_4$ of the two sides and the rope display segments $56_5$ and $56_8$ of the animated display portion 52 are driven. The segments $56_9$ and $56_{10}$ which indicate the boxers waiting in their corners are driven. The round display is performed for one second. In step A5, it is checked whether or not the data of the round time which is stored in the register C is present. If YES, the key signal is fetched in step A6 and the key signal processing in step A7 is executed. In step A7, the conditions such as guard, punching and swaying of your boxer are displayed in accordance with the key operation to be described in detail later. However, when the key operation is not yet performed, the guard posture is displayed as shown in FIG. 11C. In step A8, data of the attack pattern is read out from the pattern data memory section 40 and is supplied to the register B. In step A9, the conditions such as guard, punching and swaying of the opponent are displayed in the same manner as in step A7. The opponent is first displayed in the guard posture.

In step A10, it is checked whether the punch flag is present in the register A and the register B. If YES, the flow advances to step A11 in case of your boxer or to step A12 in case of the opponent; otherwise, the flow advances to step A12 for displaying the stamina and the punching power. At this time, since the punch flag is not present, the flow advances from step A10 to step A13. The stamina and the punching power of your boxer and his opponent are displayed at the digital display portion 50, as shown in FIG. 11C. The stamina "50" and the punching power "6" of the opponent are displayed at the upper four digits of the digital display portion 50, at which the stamina "50" and the punching power "6" of your boxer are displayed at the lower four digits. The ring display is performed as will be described in detail in step A14. The flow advances to execute the round time processing or operation in step A15, the punching power processing in step A16, and the punch/sway flag reset processing in step A17. Thereafter, the flow returns to step A5. At this time, since the key operation is not yet performed, processing of steps A16 and A17 is not performed. Thus, after the stamina and the punching power of your boxer and his opponent are displayed, and after the boxers are displayed on the ring, a bout is started. The punch key 20 is pressed to deliver a punch, the up/down key 22 to indicate the guard position, and the sway key 24 to indicate swaying. Upon depression of the keys, key signals are fetched in step A6 and key signal processing is performed in step A7.

Figure 7:
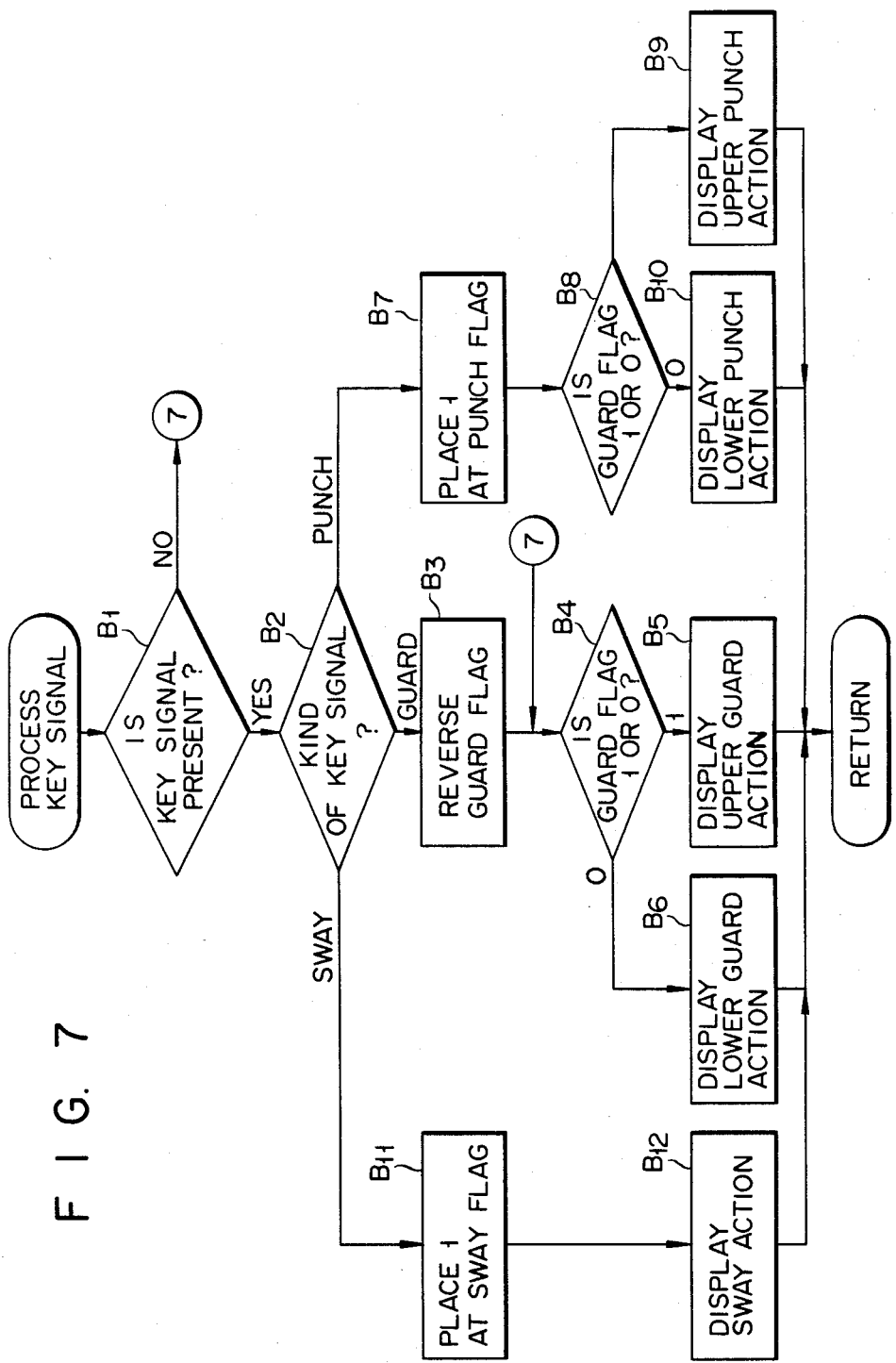
Figure 10E:
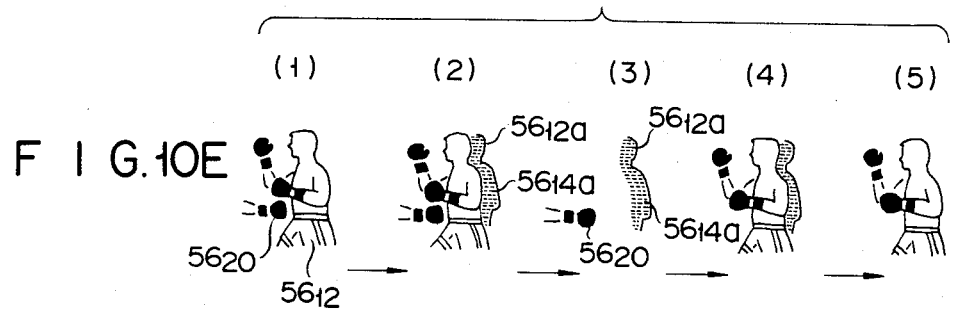
Figure 10F:
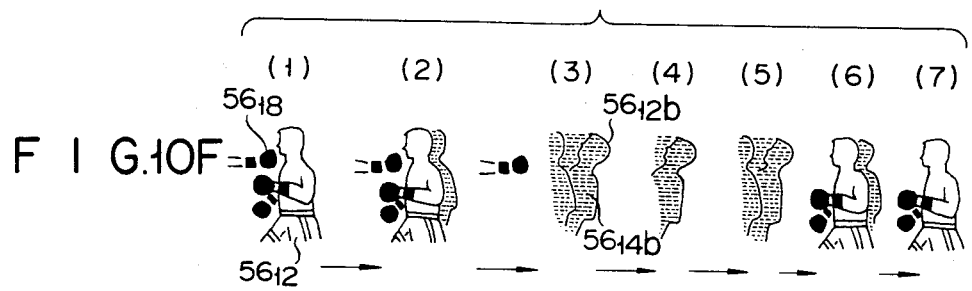
Figure 10G:
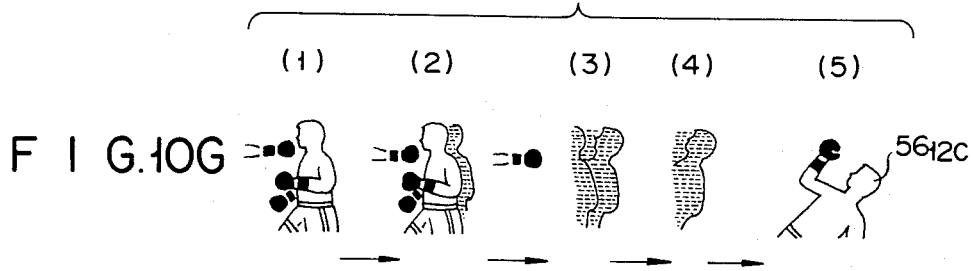
Figure 10A:
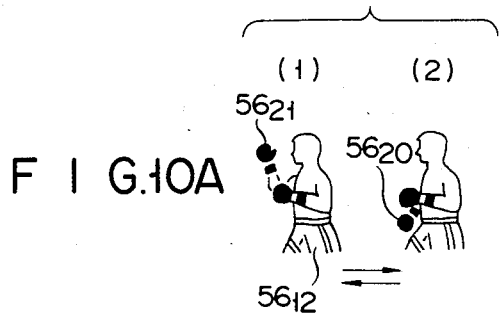
Figure 10B:
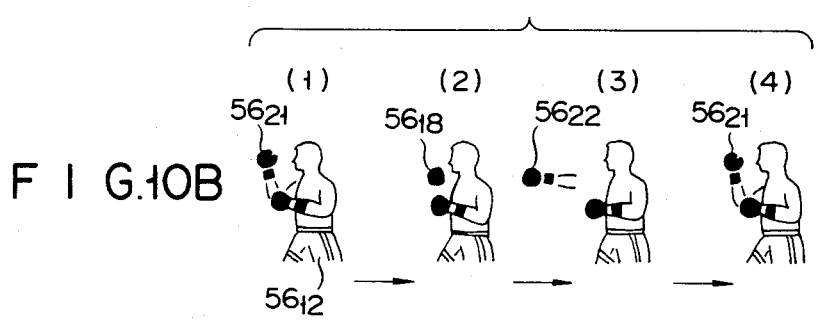
Figure 10C:
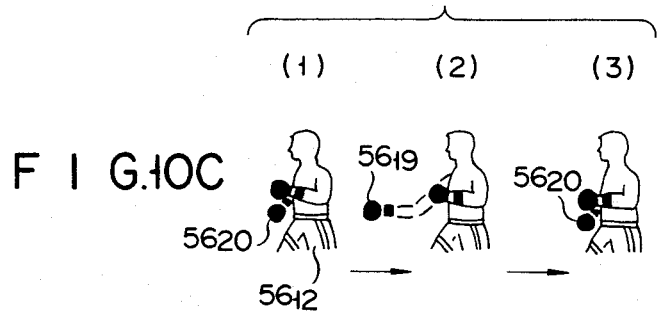
Figure 10D:
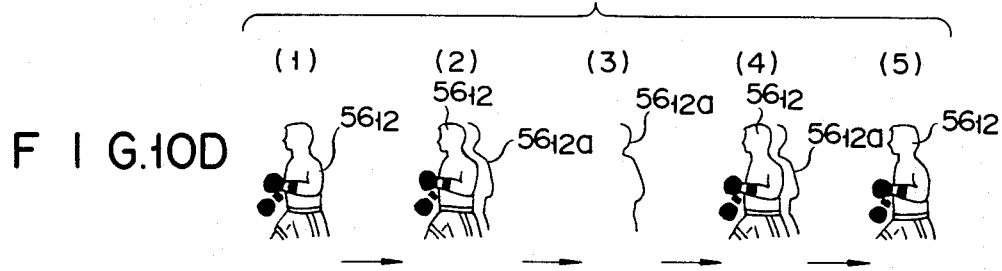

The key signal processing is performed in accordance with the process flowchart shown in FIG. 7. In step B1, it is checked whether or not a key signal is present. If YES, the flow advances to step B2 in which it is checked which data from among punch, guard, and sway is present. If guard data is present, the guard flag in the register A is inverted in step B3. In step B4, it is determined whether the guard flag is logic level "1" or "0". If it is determined to be logic level "1", the flow advances to step B5, and the storage contents of the memory section 38 are supplied to the your boxer decoder $46_3$ through the gate circuit $44_3$ to drive the segment $56_{21}$ which indicates the upper guard of the right glove as shown in FIG. 10A(1). However, if it is determined that the guard flag is logic level "0", the flow advances from step B4 to step B6. The segment $56_{20}$ which indicates the lower guard, is driven, as shown in FIG. 10A(2). In step B2, if it is determined that the content of the key signal is a punch, the flow advances to step B7. The punch flag of the register A is set to logic level "1". Subsequently, it is checked in step B8 whether the guard flag in the register A is logic level "1" or "0". If it is determined that the guard flag is logic level "1" in step B8, the flow advances to step B9. The segments $56_{21}$, $56_{18}$, $56_{22}$ and $56_{21}$ are sequentially driven in the order named to display the head punch posture (high blow) as shown respectively in FIGS. 10B(1) to 10B(4). However, if it is determined that the guard flag is logic level "0" in step B8, the flow advances to step B10. The segments $56_{20}$, $56_{19}$ and $56_{20}$ are sequentially driven in the order named to display a body blow as shown in FIGS. 10C(1) to 10C(3). When the content of the key signal is determined to be sway data, the flow advances to step B11, and the sway flag of the register A is set to logic level "1". In step B12, the boxer sways to dodge the punch by driving a combination of the segments $56_{12}$ and $56_{12a}$, as shown in FIGS. 10D(1) to 10D(5).

When the key signal processing step A7 is completed, the flow returns to step A8 shown in FIG. 6A. Another attack pattern data is read out from the pattern data memory section 40 and is supplied to the register B. Processing in step A9 is then performed corresponding to the attack pattern data. In the same manner as described in step A7, the display of the guard, punch, and sway movements is performed in accordance with the attack pattern of the opponent. In step A10, it is checked whether the punch flag is present. If it is determined that the flag is present, steps A11 and A12 are performed to process the punching operation. In this case, if the flag is present in the register A, step A11 is executed.

Figure 8A:
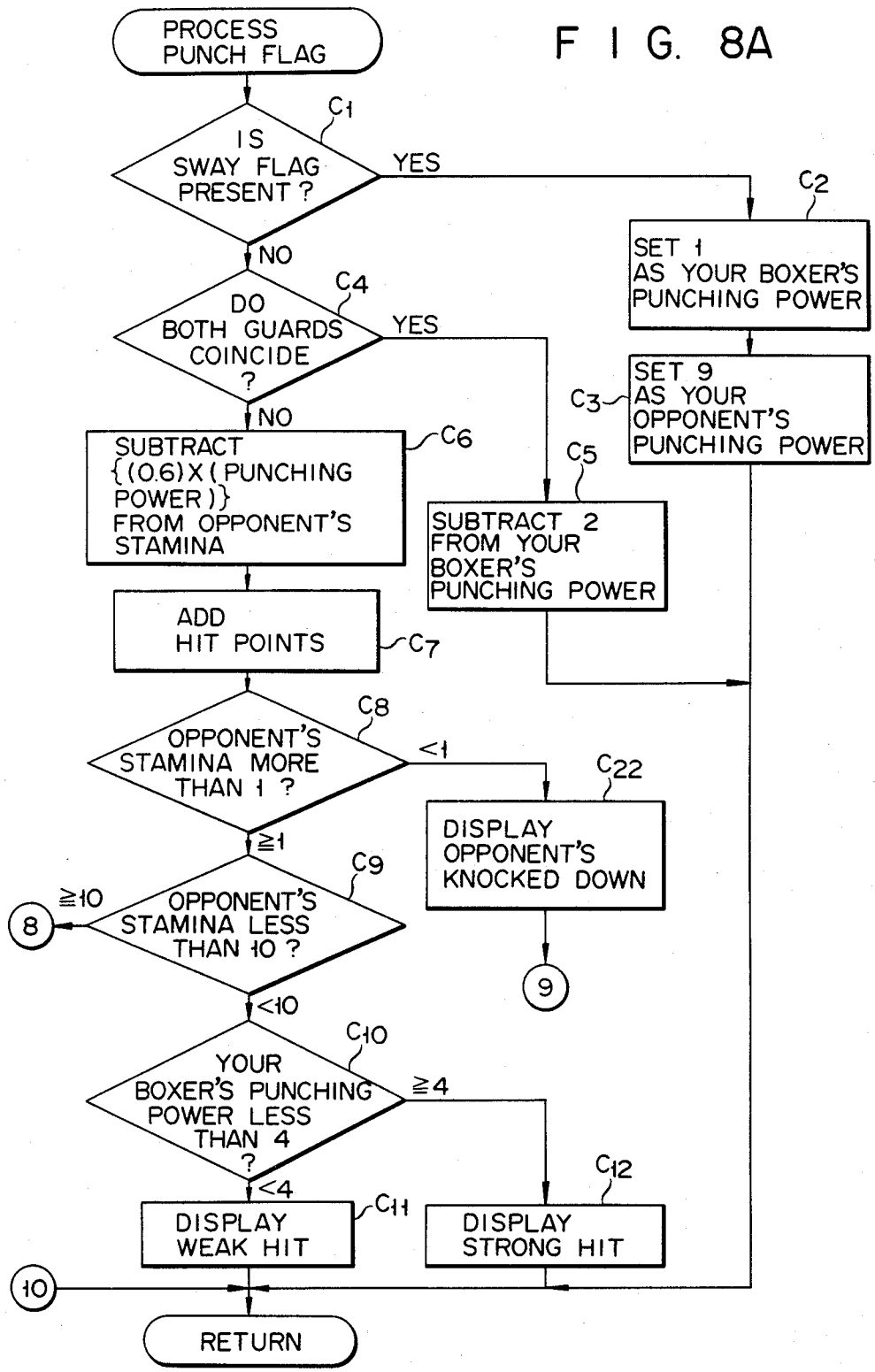
Figure 8B:
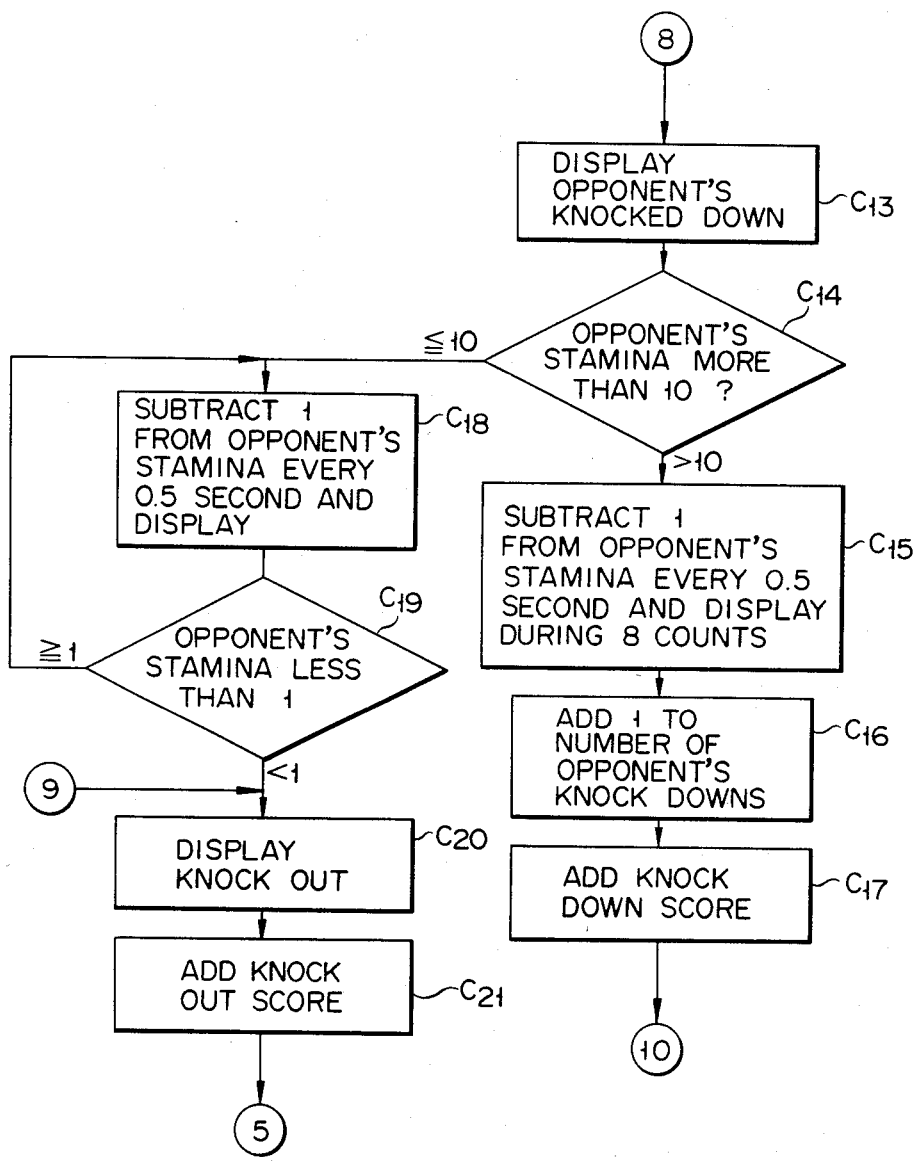

The processing of punching action in step A11 will be described in detail with reference to the process flowcharts in FIGS. 8A and 8B. As shown in step C1, it is checked whether the opponent's sway flag is present. If YES, the opponent has swayed to dodge your boxer's punch. In step C2, the punching power of your boxer is changed to "1". In step C3, the opponent's punching power is changed to "9". However, if the sway flag of the opponent is not present, the flow advances to step C4. It is checked whether both guards coincide. If YES in step C4, the flow advances to step C5. The punching power of your boxer is decreased by two. However, if NO in step C4, a punch of your boxer is a hit, and the flow advances to step C6. The opponent's stamina is decreased by (0.6×punching power). Hit or punching points are added in step C7, and the count is stored in the register C. In step C8, it is checked whether the opponent's stamina is less than 1 or more than 1. If it is determined to be greater than 1, the flow advances to step C9. It is then checked whether the opponent's stamina fatigue is more than 10 or less than 10. If it is determined to be less than 10, it is checked whether your boxer's punching power is more than 4 or less than 4 in step C10. If it is determined to be less than 4, the flow advances to step C11 to display a weak punch. As shown in FIGS. 10E(1) to 10E(5), a dotted line display segment $56_{14a}$ is driven. At the same time, the segments $56_{20}$ and $56_{18}$ which indicate the punch delivered by the opponent, together with the segments showing the arm and the wrist of the opponent are driven, as opposed to the sway display shown in FIG. 10D. However, in step C10, if it is determined that your boxer's punching power is greater than 4, the flow advances to step C12. A clean hit punch by the opponent is displayed. As shown in FIGS. 10F(1) to 10F(7), the clean blow is displayed by a combination of the segments $56_{12b}$ and $56_{14b}$, as opposed to the weak blow. In step C9, if it is determined that the opponent's stamina fatigue is more than 10, the flow advances to step C13. A knockdown of the opponent is displayed. If your boxer is knocked down, the segment $56_{12c}$ indicating the knockdown state is driven in addition to the segments which are driven for the clean punch, as shown in FIGS. 10G(1) to 10G(5). Thereafter, it is checked in step C14 whether the opponent's stamina is less than 10 or more than 10. If it is determined to be greater than 10, the flow advances to step C15. The opponent's stamina is decreased by one every 0.5 second, for a total of four seconds. Thereafter, the stamina is decreased by a total of eight. In step C16, the number of opponent's knockdowns is increased by one. In step C17, 10 points as a knockdown score are added to the current score of your boxer. However, if in step C14 it is determined that the opponent's stamina is less than 10, the flow advances to step C18. The opponent's stamina is decreased by 1 every 0.5 second and is displayed. In step C19, it is checked whether the opponent's stamina is less than 1 or more than 1. If it is determined to be more than 1, the flow returns to step C18. When the opponent's stamina becomes smaller than 1, the flow advances to step C20. A KO is then displayed, and data of logic level 1 is written in the victory (winning) or defeat (losing) flag position. In step C21, the KO score is added to the current score of your boxer. If it is determined in step C8 that the opponent's stamina is less than 1, the flow advances to step C22. The opponent's knockdown is displayed. The flow immediately advances to step C20. The KO is displayed, and data of logic level "1" is written in the victory or defeat flat position. In step C21, a knockout score is added. The knockout scores differ in accordance with the round wherein the knockout occurs. 1,000 points are scored for a first round knockout, and this decreases by 100 points for each subsequent round. When processing steps C3, C11, C12 and C17 are completed, the flow advances to step A13 shown in FIG. 6A. However, when the processing in step C21 is completed, the score display step to be described later is executed.

If it is determined in step A10 shown in FIG. 6A that the punch flag of the opponent is present, the flow advances to step A12. The hit (punching) processing is performed in the same manner as step A11 for your boxer. Even if the opponent's punch hits, various scoring processes should not be performed. The flow advances to step A13 except for a KO. In step A13, the stamina and the punching power of your boxer, which are calculated in step A11, and the stamina and the punching power of the opponent, which are calculated in step A12 are displayed as shown in FIGS. 11D and 11E, respectively. The flow then advances to step A14, and the ring display processing is performed, which will be described in detail with reference to the process flowchart in FIG. 9. In step D1, it is checked whether the stamina difference between your boxer and his opponent for the round is less than 1 or more than 1. If it is determined to be less than 1, the flow advances to step D2 in which the ring center display is performed, that is, the boxers are displayed at the center of the ring as shown in FIG. 11C. This is performed by driving the segments $56_1$, $56_4$, $56_5$ and $56_8$. However, if it is determined that your boxer's stamina is greater than the opponent's and the stamina difference is more than 1, in addition to the initial stamina difference, the flow advances from step D1 to step D3. Thus, the opponent's corner is displayed by driving the corner segment $56_2$ and the rope segment $56_6$, as shown in FIG. 11D. In this case, other corner segments $56_1$, $56_3$, and $56_4$ and other rope segments $56_5$, $56_7$ and $56_8$ are not driven for display. However, if your boxer's stamina is greater than the opponent's stamina for the round and the stamina difference is greater than 1, the flow advances from step D1 to step D4. Then, the corner of your boxer is displayed by driving the corner segment $56_3$ and the rope segment $56_7$.

When various ring conditions are displayed as described above, the round time processing in step A15 shown in FIG. 6A is executed. Data of the elapsed time interval is decreased by the round time data stored in the register C. Thereafter, in step A16, the punching power processing is performed to add one to the punching powers of your boxer and his opponent. This incrementing operation is performed every time the flow returns to the initial step up to the upper limit of the punching power. In step A17, the punch or sway flag is reset. The flow then returns to step A5.

The game is played as described above. When 30 seconds have elapsed from the beginning of the game, it is determined in step A5 that the round time interval has elapsed. The first round is over, and the flow advances to step A18. It is then checked whether the round number has reached 8. If NO, the flow advances to step A19, and the processed contents are displayed. The processing in step A19 is performed by the number of knockdowns and the stamina which are indicated by relations (1) and (2) of item (C) above. The results are displayed for one second as shown in FIG. 11F. FIG. 11F shows a case in which your boxer is one point ahead of the opponent by 10:9. As shown in step A20, the count of the number of rounds is incremented by one, and the flow returns to step A4. The next round is displayed for one second. Thereafter, the second round begins and the processing of step A5 and subsequent steps is executed. Data of your boxer's stamina at the end of a round is transferred as the initial stamina for the next round to the sixth to eighth digit positions of the register A, while data of your opponent's stamina at the end of a round is transferred as the initial stamina for the next round to the sixth to eighth digit positions of the register B.

The game is played in the same manner as described above. Assume that your boxer knocks down the opponent by delivering a clean punch when the opponent's stamina is 8. Steps C9, C13, C14, C18, C19 and C20 in FIGS. 8A and 8B are executed, so that the opponent is knocked out. In step C20, as shown in FIG. 11H, the fifth round is displayed and at the same time the opponent who is knocked out is displayed. The flow advances from step C20 to step C21 in which a KO score is added. Then, the flow advances to step A21 shown in FIG. 6B. The score and the winning number are displayed for one second. FIG. 11I shows a case in which your boxer scores 745 points. Thereafter, the flow advances to step A22, and the winning number of 1 is increased by one, so that the updated winning number becomes 2. The flow then advances to step A23. It is checked whether the winning number is greater than 20 or smaller than 20. If it is determined to be smaller than 20, the flow returns to step A3. Data corresponding to the winning number of 2 is read out from the pattern data memory section 40 and is written in the registers A and B. The round is displayed in step A4, and the flow advances to step A5. The game control is performed in the same manner as described above. If no KO occurs throughout eight rounds, the flow advances from step A18 to step A24. The winner is then determined for the bout, and the judgment result is displayed. The flow then advances to step A25 in which the points of your boxer for the total rounds are added, and the points of the opponent for the total rounds are added. The total points of your boxer and the total points of the opponent are displayed in a manner shown in FIG. 11J at the digital display portion 50. FIG. 11J shows a case in which the opponent wins by 79:75. Thereafter, the flow advances to step A26, in which the total score of your boxer is compared with that of the opponent. If the score of your boxer is greater than that of the opponent, victory or defeat flag of the register C is set to "1". At the same time, the flow advances to step A21 in which the winning number and the score of your boxer are displayed. The flow then advances to step A22, and the winning number is increased by one. It is checked in step A23 whether the winning number is more than 20 or less than 20. If it is determined to be less than 20, the flow returns to step A3 and the game is continued. If the result obtained in step A26 is that the total count of your boxer is less than that of the opponent, the victory or defeat flag is set to "0" and the flow advances to step A27. As shown in FIG. 11K, the winning number and score of your boxer are displayed. At the same time, according to the victory or defeat flag of the register C, the opponent is displayed, and his victory or defeat is displayed. Furthermore, a sign "GAME OVER" is displayed by driving the segment $56_{23}$. FIG. 11K shows a case in which your boxer is defeated by the third opponent boxer and obtains a total score of 1234 points. If it is determined in step A12 that the opponent knocks out your boxer, the victory or defeat flag is set to logic level "0", and the flow advances to step A27. If it is determined in step A23 that the winning number is greater than 20, the winning number is decreased by one in step A28 to set the winning number as 20. Thereafter, the flow advances to step A27. The winning number and the total score of your boxer are displayed in step A27. At the same time, the logic level of the victory or defeat flag in the register C is checked. If it is "0", the opponent is displayed. However, if it is "1", your boxer is displayed. The flow then advances to step A29. Processing of the highest winning number and the highest score are performed. Data of the winning number and data of the score obtained in the immediately previous game, which are stored in the register C, are compared with data of the highest winning number and data of the highest score, which are stored in the register D. If the winning number and the score exceed the highest winning number and the highest score respectively, the storage contents in the register D are updated. Thus, all the processing of the game is completed.

According to the above embodiment, the movement of the ring, a change in guard positions, punching from a guard position, and a shaded display at a delivered punch are displayed as in an actual boxing match. Furthermore, the gloves are used in common for your boxer and his opponents, thus simplifying the wiring. Also, since the current stamina and the power of a punch are digitally displayed, the current conditions of the boxers can be known, making the game more interesting.

In the above embodiment, your boxer first fights a flyweight boxer and then a heavier class boxer unless your boxer is defeated by an opponent. However, your boxer may fight a desired boxer who belongs to a certain weight class. In the above embodiment, the boxer delivers the head punch and the body blow and defends by the upper and lower guard positions. However, the boxer may deliver a punch at an intermediate position and may defend at this position. Furthermore, in the above embodiment, the time interval from depression of the key to the corresponding action is kept constant. However, if the time interval from depression of the key to the corresponding action is increased in accordance with the stamina fatigue, a more realistic movement can be obtained. Moreover, in the above embodiment, the punch key, the up/down key, and the sway key are provided only for your boxer for a single player to play the game. However, a pair of punch, up/down, and sway keys may be formed, so that the boxing game can be played by two players.

In the above embodiment, the present invention is applied to a compact electronic calculator. However, it may be combined with other equipment such as a watch. Of course, the invention may be independently arranged.

Other changes and modifications may be provided within the spirit and scope of the present invention.

What is claimed is:

1. An electronic fighting sport game apparatus, comprising:
   displaying means including an attack display portion in which opposing fighting display figures appear to attack each other;
   driving means connected to said displaying means for selectively supplying a drive signal to said fighting display figures;
   display data storing means connected to said driving means for storing display data to selectively display said fighting display figures and for supplying corresponding display data to said driving means;
   key input means including at least one attack key for specifying an attack for at least one of said fighting display figures displayed on said displaying means;
   display data producing means connected to said key input means and said display data storing means for producing the display data for said at least one of said fighting display figures in accordance with operation of said at least one attack key and for supplying the display data to said display data storing means;
   attack success determining means connected to said display data storing means for receiving the display data of said fighting display figures which is stored in said display data storing means for determining which fighting display figure succeeds to deliver a blow;

stamina data storing means for storing initial stamina data and current stamina data for said fighting display figures;

stamina data operating means connected to said stamina data storing means and said attack success determining means for reading out from said storing means the current stamina data of one of said fighting display figures when attacked by another of said fighting display figures and when said attack success determining means determines that the attack is successful, wherein said stamina data operating means decrements the read out stamina data by a predetermined amount and restores into said stamina data storing means stamina data corresponding to a decreased count; and winner determining means connected to said stamina data storing means for receiving the stamina data of said fighting display figures which is stored in said stamina data storing means to determine a winner in accordance with predetermined conditions;

wherein said stamina data storing means is arranged to store attack power data, and said stamina data operating means includes means for calculating the attack power data in accordance with the stamina data of each of said fighting display figures and means for decreasing stamina data of one of said fighting display figures which is attacked by a predetermined amount on the basis of the attack power data of the other of the attacking fighting display figures when said attack success determining means determines a successful attack.

2. An electronic fighting sport game apparatus according to claim 1, wherein said stamina data storing means is connected to said driving means; said calculating means of said stamina data operating means calculates the attack power of each of said fighting display figures in accordance with the stamina data thereof to allow said stamina data storing means to store the attack data, and said decreasing means of said stamina data operating means decreases the stamina data of said one of said fighting display figures which is attacked in accordance with the attack power data of the other of said fighting display figures by a predetermined amount and allows said stamina data storing means to store the attack power data; and said displaying means includes an attack power data display segment arranged to receive the drive signal from said driving means on the basis of the attack power data.

3. A fighting sport game machine according to claim 2, wherein said displaying means includes a stamina data display segment, and said driving means is arranged to supply the drive signal to said stamina data display segment on the basis of the stamina data.

4. A fighting sport game apparatus according to claim 1, wherein said fighting display figures of said displaying means comprise boxers; and said winner determining means is arranged to judge a fighting display figure to be a loser when the associated stamina data is zero within a predetermined time interval, and to judge the fighting display figures to be a loser when the fighting display figure has associated stamina data which is smaller than the stamina data of the other of said fighting display figures if the stamina data associated with none of said fighting display figures is decreased to zero within the predetermined time interval.

5. An electronic fighting sport game apparatus, comprising:

displaying means including an attack display portion in which opposing fighting display figures appear to attack each other;

driving means connected to said displaying means for selectively supplying a drive signal to the fighting display figures;

display data storing means connected to said driving means for storing display to selectively display said fighting display figures and for supplying corresponding display data to said driving means;

key input means including at least one attack for specifying an attack for at least one of said fighting display figures displayed on said displaying means;

display data producing means connected to said key input means and said display data storing means for producing the display data for said at least one of said fighting display figures in accordance with operation of said at least one attack key and for supplying the display data to said display data storing means;

attack success determining means connected to said display data storing means for receiving the display data of said fighting display figures which is stored in said display data storing means for determining which fighting display figure succeeds to deliver a blow;

stamina data storing means for storing initial stamina data and current stamina data for said fighting display figures;

stamina data operating means connected to said stamina data storing means and said attack success determining means for reading out for said storing means the current stamina data of one of said fighting display figures when attacked by another of said fighting display figures and when said attack success determining means determines that the attack is successful, wherein said stamina data operating means decrements the read out stamina data by a predetermined amount and restores into said stamina data storing means stamina data corresponding to a decremented count;

winner determining means connected to said stamina data storing means for receiving the stamina data of said fighting display figures which is stored in said stamina data storing means to judge a winner in accordance with predetermined conditions; and score calculating means for calculating at least one of a winning number and a score on the basis of the judgment made by said winner determining means and for obtaining a maximum value corresponding to said at least one of a winning number and a score obtained through the execution of a game;

said stamina data storing means being arranged to store attack power data, and said stamina data operating means comprises means for calculating the attack power data in accordance with the stamina data of each of said fighting display figures and means for decreasing stamina data of one of the fighting display figures which is attacked by a predetermined amount on the basis of the attack power data of the other of the attacking fighting display figures when said attack success determining means determines a successful attack.

6. An electronic fighting sport game apparatus according to claim 5, wherein said display data producing means is arranged to produce display data of one of said fighting display figures in accordance with operation of said attack keys of said key input means, and to produce the display data of the other of said fighting display figures independently of the operation of said attack keys and on the basis of predetermined conditions.

7. An electronic fighting sport game apparatus according to claim 5, wherein said stamina data storing means is connected to said driving means, and said displaying means includes a stamina data display segment arranged to be driven by the drive signal supplied from said driving means.

8. An electronic fighting sport game apparatus according to claim 5, wherein said fighting display figures of said displaying means comprise boxers; said attack display portion comprises attack display segments which indicate an arm and a glove; and said attack keys of said key input means comprise punch keys, wherein said attack display portion which indicates an arm and a glove of another of said fighting display figures is driven by the drive signal supplied from said driving means to perform an attack on said one of said fighting display figures.

9. An electronic fighting sport game apparatus according to claim 8, wherein said key input means includes a defense key; and each of said fighting display figures includes a defense display segment corresponding to said attack display segment, wherein said defense display segment of said one of said fighting display figures is driven by the drive signal supplied from said driving means when said defense key is pressed, and said attack display segment which corresponds to said defense display segment is driven by the drive signal supplied from said driving means in accordance with said defense display segment when said attack key is pressed.

10. An electronic sport game apparatus according to claim 8, wherein said displaying means includes ring rope display segments which surround said fighting display figures, so that a ring rope is displayed to indicate one's own corner, a ring center and an opponent's corner in accordance with stamina data stored in said stamina data storing means.

11. An electronic sport game apparatus according to claim 5, wherein said fighting display figures of said displaying means comprise boxers; and said winner determining means is arranged to judge a fighting display figure to be a loser when the associated stamina data is zero within a predetermined time interval, and to judge the fighting display figure to be a loser when the fighting display figure has associated stamina data which is smaller than the stamina data of the other of said fighting display figures if the stamina data associated with none of said fighting display figures is decreased to zero within the predetermined time interval.

12. An electronic fighting spot game apparatus according to claim 5, wherein said maximum value corresponding to at least one of a winning number and a score which value is calculated by said score calculating means is displayed on said displaying means during the start of a game.

13. An electronic fighting sport game apparatus according to claim 12, which comprises a calculator and wherein said key input means includes ten keys and a function key.

14. An electronic fighting sport game apparatus, comprising:

displaying means including an attack display portion in which opposing fighting display figures appear to attack each other;

driving means connected to said displaying means for selectively supplying a drive signal to the fighting display figures;

display data storing means connected to said driving means for storing display data to selectively display said fighting display figures and for supplying corresponding display data to said driving means;

key input means including at least one attack key for specifying an attack for at least one of said fighting display figures displayed on said displaying means;

display data producing means connected to said key input means and said display data storing means for producing the display data for said at least one of said fighting display figures in accordance with operation of said at least one attack key and for supplying the display data of said display data storing means;

attack success determining means connected to said display data storing means for receiving the display data of said fighting display figures which is stored in said display data storing means for determining which fighting display figure succeeds to deliver a blow;

stamina data storing means for storing initial stamina data and current stamina data for said fighting display figures;

stamina data operating means connected to said stamina data storing means and said attack success determining means for reading out from said storing means the current stamina data of one of said fighting display figures when attached by another of said fighting display figures and when said attack success determining means determines that the attack is successful, wherein said stamina data operating means decrements the read out stamina data by a predetermined amount and restores into said stamina data storing means stamina data corresponding to a decremented count;

winner determining means connected to said stamina data storing means for receiving the stamina data of said fighting display figures which is stored in said stamina data storing means to judge a winner in accordance with predetermined conditions; and score calculating means for calculating at least one of a winning number and a score on the basis of the judgment made by said winner determining means and for obtaining a maximum value corresponding to said at least one of a winning number and a score obtained through the execution of a game;

said stamina data storing means being connected to said driving means and being arranged to store attack power data;

said stamina data operating means comprises means for calculating the attack power data of each of said fighting display figures in accordance with the stamina data thereof to allow said stamina data storing means to store the attack data, and means for decreasing stamina data of one of said fighting display figures which is attacked in accordance with the attack power data of the other of said fighting display figures by a predetermined amount to allow said stamina data storing means to store the attack power data; and said displaying means includes an attack power data display segment arranged to receive the drive signal from said driving means on the basis of the attack power data.

15. An electronic fighting sport game apparatus according to claim 14, wherein said display data producing means is arranged to produce display data of one of said fighting display figures in accordance with operation of said attack keys of said key input means, and to produce the display data of the other of said fighting display figures independently of the operation of said attack keys and on the basis of predetermined conditions.

16. An electronic fighting sport game apparatus according to claim 14, wherein said stamina data storing means is connected to said driving means, and said displaying means includes a stamina data display segment arranged to be driven by the drive signal supplied from said driving means.

17. An electronic fighting sport game apparatus according to claim 14, wherein said displaying means includes a stamina data display segment, and said driving means is arranged to supply the drive signal to said stamina data display segment on the basis of the stamina data.

18. An electronic fighting sport game apparatus according to claim 14, wherein said fighting display figures of said displaying means comprise boxers; said attack display portion comprises attack display segments which indicate an arm and a glove; and said attack keys of said key input means comprises punch keys, wherein said attack display portion which indicates an arm and a glove of another of said fighting display figures is driven by the drive signal supplied from said driving means to perform an attack on said one of said fighting display figures.

19. An electronic fighting sport game apparatus according to claim 18, wherein said key input means includes a defense key; and each of said fighting display figures includes a defense display segment ccorresponding to said attack display segment, wherein said defense display segment of said one of said fighting display figures is driven by the drive signal supplied from said driving means when said defense key is pressed, and said attack display segment which corresponds to said defense display segment is driven by the drive signal supplied from said driving means in accordance with said defense display segment when said attack key is pressed.

20. An electronic sport game apparatus according to claim 18, wherein said displaying means includes ring rope display segments which surround said fighting display figures, so that a ring rope is displayed to indicate one's own corner, a ring center and an opponent's corner in accordance with stamina data stored in said stamina data storing means.

21. An electronic sport game apparatus according to claim 14, wherein said fighting display figures of said displaying means comprise boxers; and said winner determining means is arranged to judge a fighting display figure to be a loser when the associated stamina data is zero within a predetermined time interval, and to judge the fighting display figure to be a lower when the fighting display figure has associated stamina data which is smaller than the stamina data of the other of said fighting display figures if the stamina data associated with none of said fighting display figures is decreased to zero within the predetermined time interval.

22. An electronic fighting sport game apparatus according to claim 14, wherein said maximum value corresponding to at least one of a winning number and a score which value is calculated by said score calculating means is displayed on said displaying means during the start of a game.

23. An electronic fighting sport game apparatus according to claim 22, which comprises a calculator and wherein said key input means includes ten keys and a function key.

* * * * *

UNITED STATES PATENT AND TRADEMARK OFFICE
CERTIFICATE OF CORRECTION

PATENT NO. : 4,491,324

DATED : January 1, 1985

INVENTOR(S) : Takao YOSHIDA

It is certified that error appears in the above-identified patent and that said Letters Patent is hereby corrected as shown below:

In the Title, change the title to read --AN ELECTRONIC FIGHTING SPORT GAME APPARATUS--;

Column 16 (claim 14), line 32, after "figures when" change "attached by" to --attacked by--.

Signed and Sealed this

Twenty-seventh Day of August 1985

[SEAL]

Attest:

DONALD J. QUIGG

Attesting Officer     Acting Commissioner of Patents and Trademarks